(No Model.) 6 Sheets—Sheet 1.

G. WESTINGHOUSE, Jr. & E. RUUD.
ROTARY WATER METER.

No. 493,881. Patented Mar. 21, 1893.

WITNESSES:
T. J. Hogan.
T. E. Gaither.

INVENTORS,
Geo. Westinghouse, Jr.
Edwin Ruud,
by Snowden Bell, Att'y.

(No Model.) 6 Sheets—Sheet 3.

G. WESTINGHOUSE, Jr. & E. RUUD.
ROTARY WATER METER.

No. 493,881. Patented Mar. 21, 1893.

(No Model.) 6 Sheets—Sheet 4.

G. WESTINGHOUSE, Jr. & E. RUUD.
ROTARY WATER METER.

No. 493,881. Patented Mar. 21, 1893.

WITNESSES: INVENTORS (No Model.) 6 Sheets—Sheet 5.

G. WESTINGHOUSE, Jr. & E. RUUD.
ROTARY WATER METER.

No. 493,881. Patented Mar. 21, 1893.

WITNESSES:
T. J. Hogan.
F. E. Gaither.

INVENTORS,
Geo. Westinghouse Jr.
Edwin Ruud,
by J. Snowden Bell
Att'y.

(No Model.) 6 Sheets—Sheet 6.

G. WESTINGHOUSE, Jr. & E. RUUD.
ROTARY WATER METER.

No. 493,881. Patented Mar. 21, 1893.

WITNESSES: INVENTORS,

UNITED STATES PATENT OFFICE.

GEORGE WESTINGHOUSE, JR., AND EDWIN RUUD, OF PITTSBURG, PENNSYLVANIA, ASSIGNORS TO THE FUEL GAS AND MANUFACTURING COMPANY, OF SAME PLACE.

ROTARY WATER-METER.

SPECIFICATION forming part of Letters Patent No. 493,881, dated March 21, 1893.

Application filed November 1, 1892. Serial No. 450,648. (No model.)

*To all whom it may concern:*

Be it known that we, GEORGE WESTINGHOUSE, Jr., and EDWIN RUUD, citizens of the United States, residing at Pittsburg, in the county of Allegheny and State of Pennsylvania, have invented or discovered a certain new and useful Improvement in Water-Meters, of which improvement the following is a specification.

The object of our invention is to provide a volumetric appliance for water or other liquids, which shall be of simple and inexpensive construction, and which, by reason of its structural and operative principles, shall afford, as fully as practicable the resultant advantages of accuracy in measurements and durability of its parts.

To this end, our invention, generally stated, consists in the combination of a piston chamber provided with inlet and discharge ports, a piston fitting, without axial bearing in said chamber, so as to have the capacity of diametrical traverse therein, said piston rotating about its own axis in, and rolling peripherally on and around, the inner surface of said chamber, and being provided with ports adapted to register alternately with the inlet and discharge ports of the chamber, and a series of abutments fitting in said piston and fitting against the piston chamber.

The improvement claimed is hereinafter fully set forth.

Figure 1:
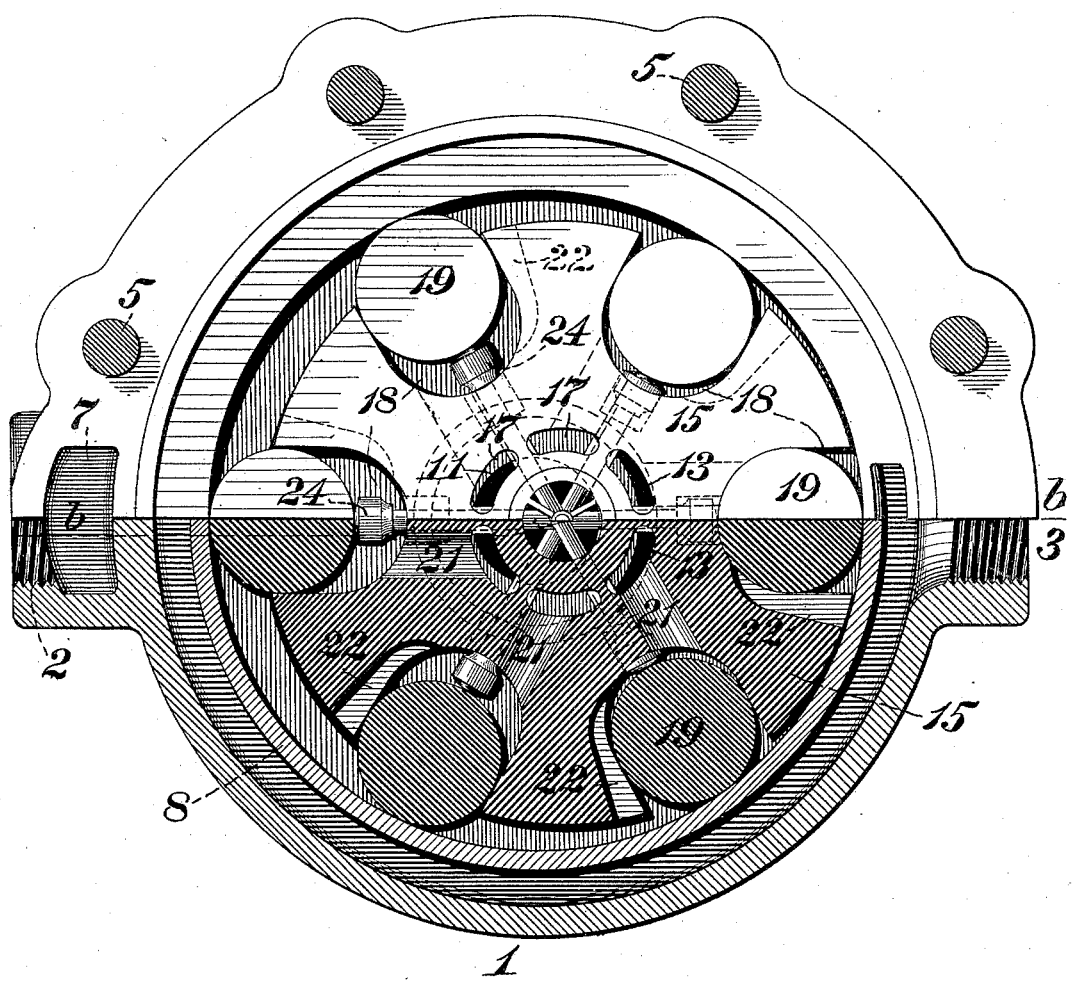
Figure 2:
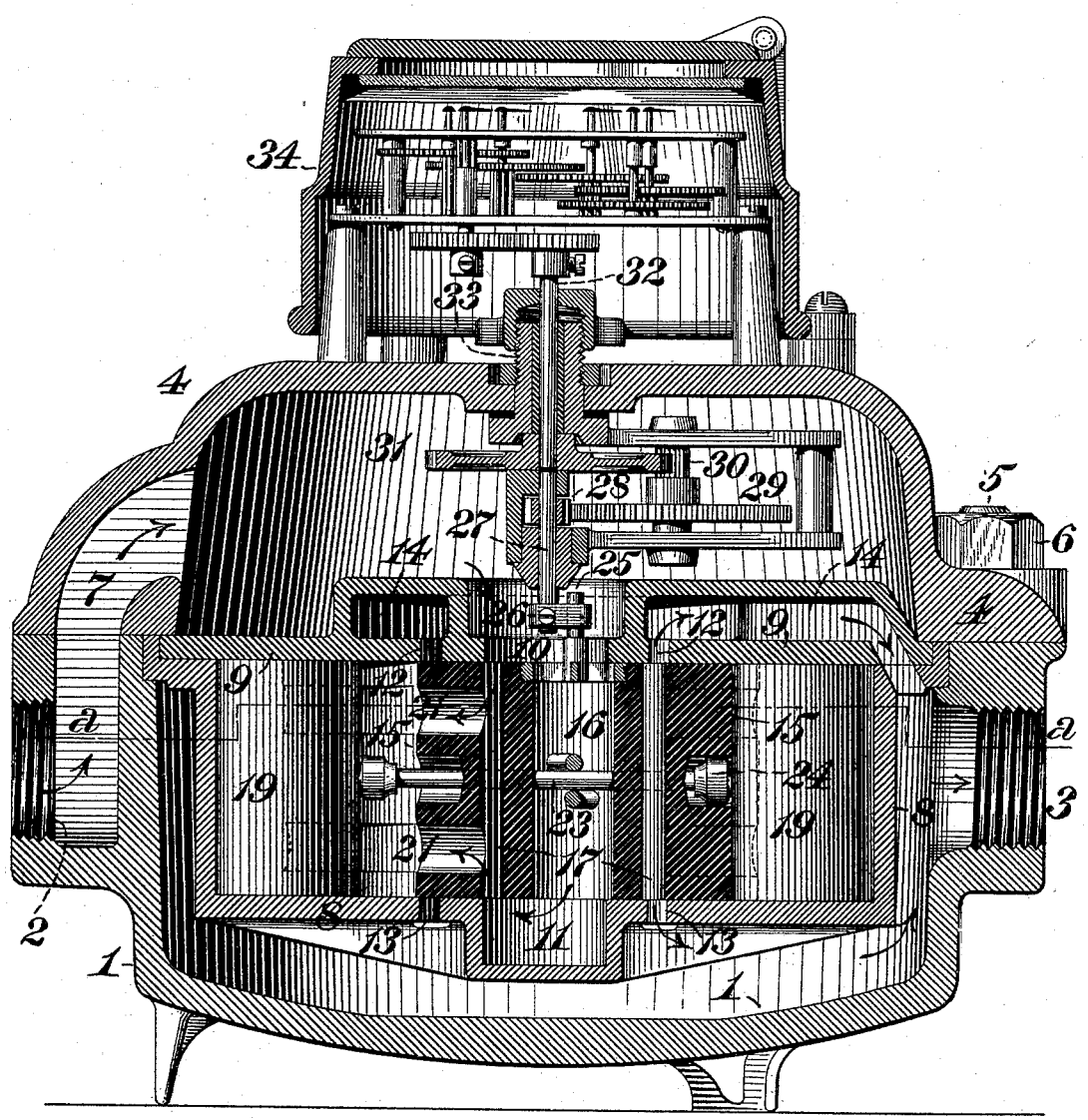
Figure 3:
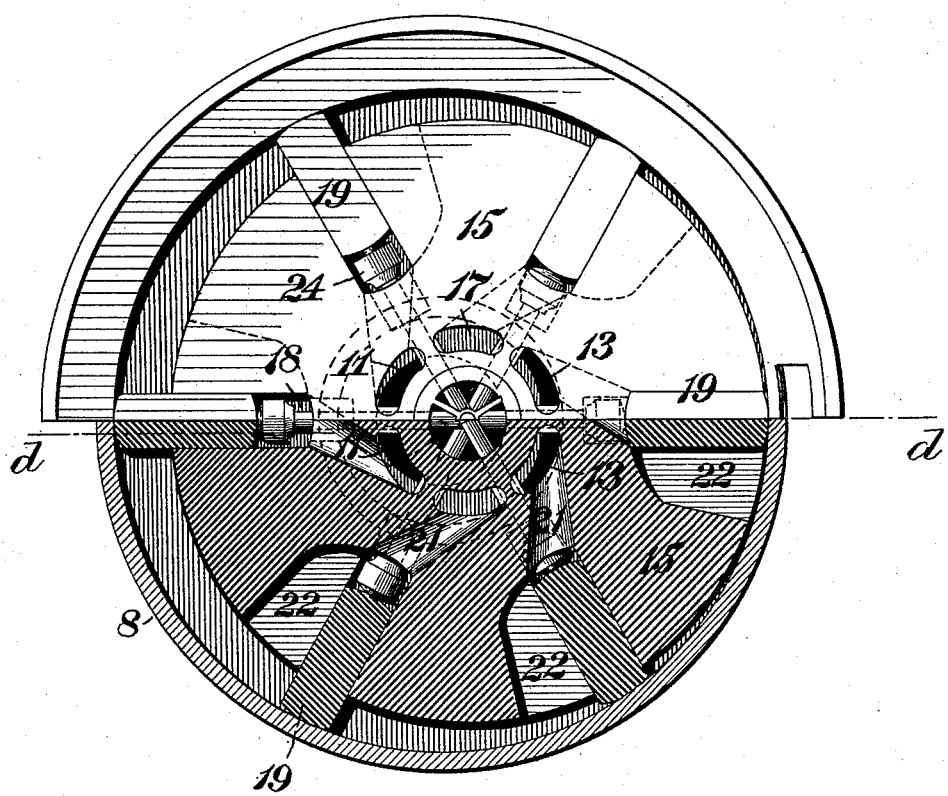
Figure 4:
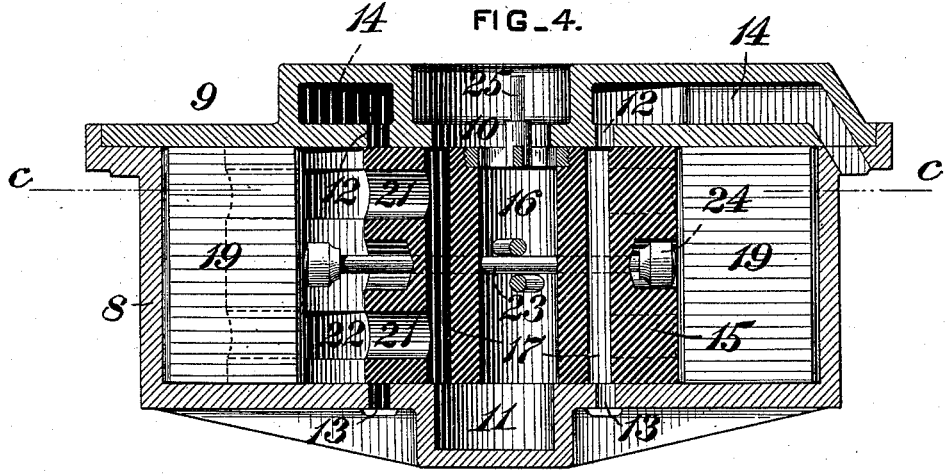
Figure 5:
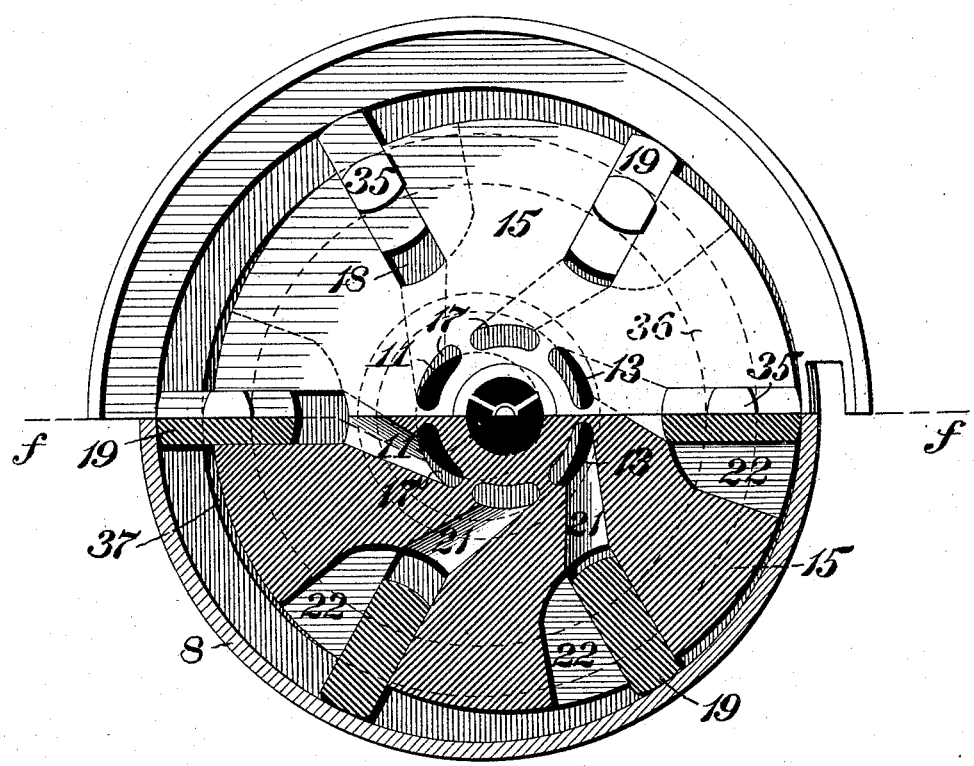
Figure 6:
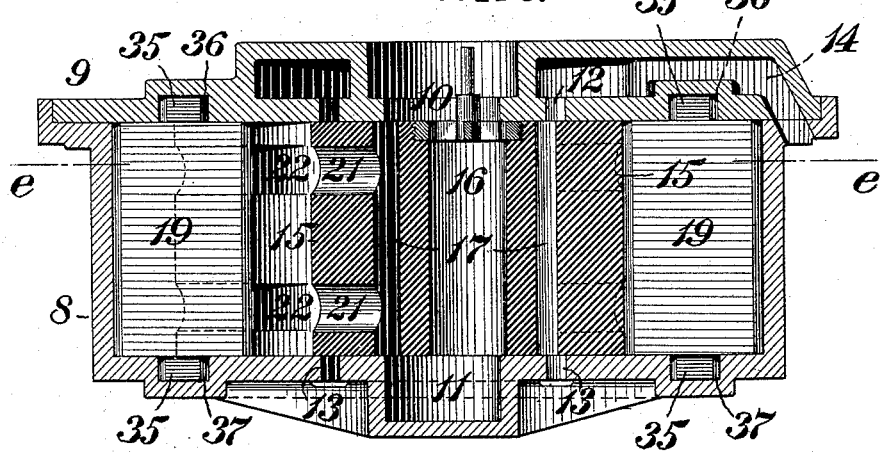
Figure 7:
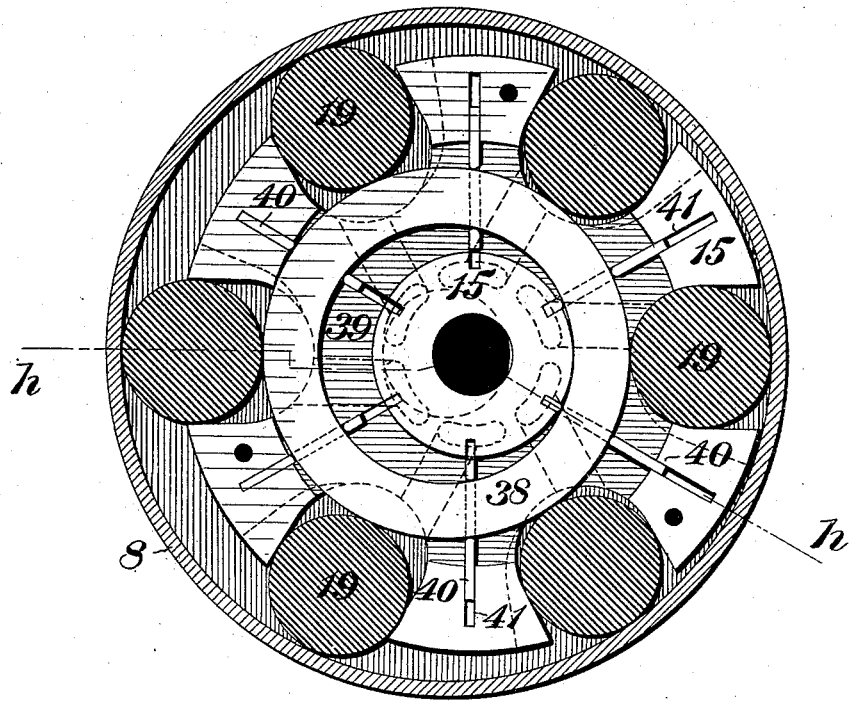
Figure 8:
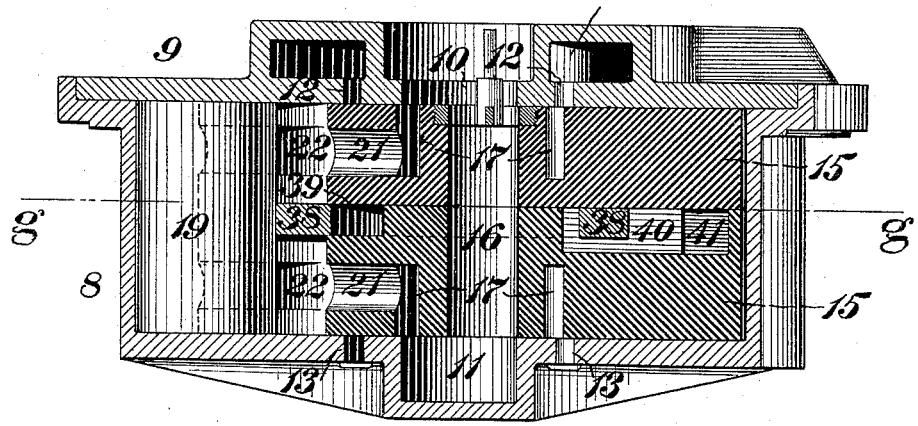
Figure 9:
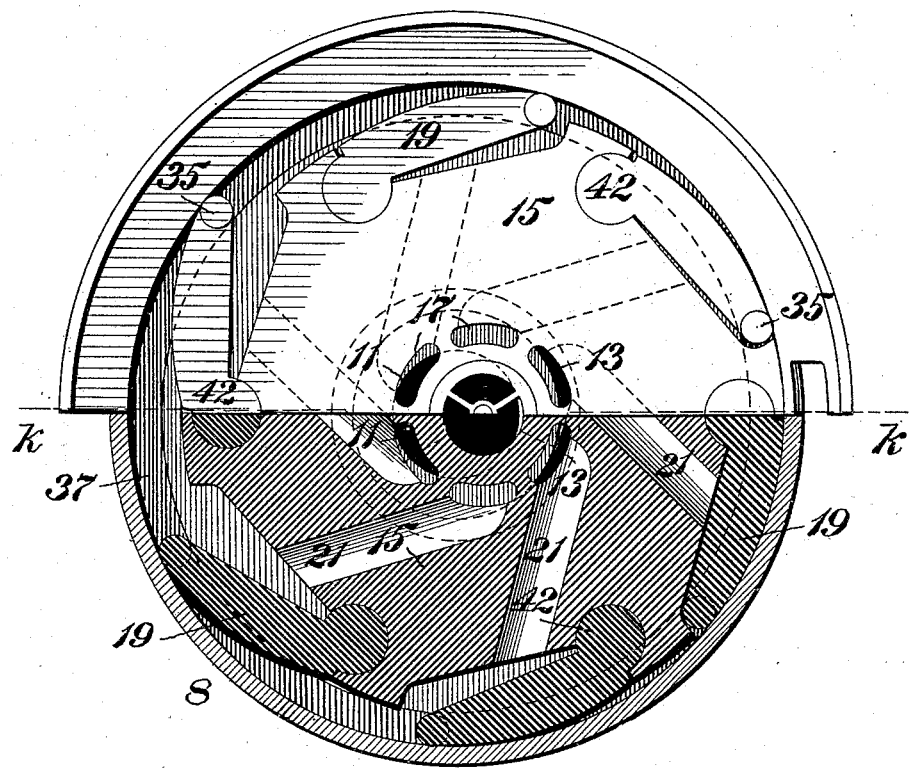
Figure 10:
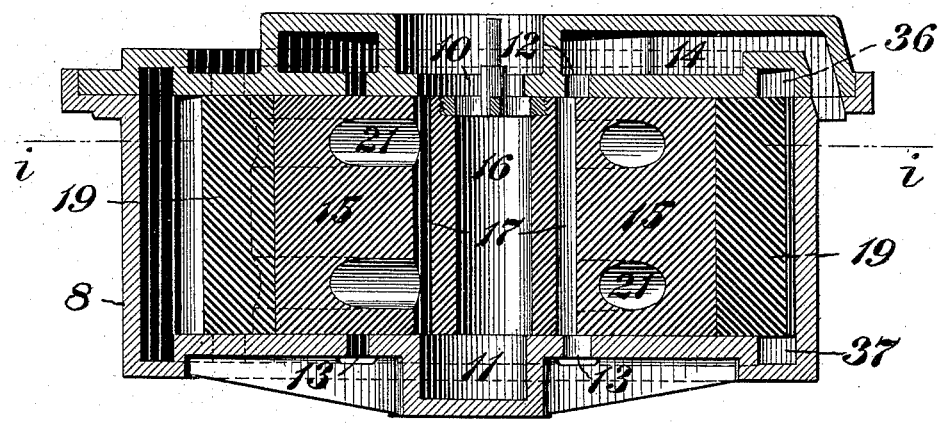

In the accompanying drawings: Figure 1 is a view, half in plan, with the caps of the casing and piston chamber removed, and half in horizontal section at the line $a, a$, of Fig. 2, of a water meter illustrating an embodiment of our invention; Fig. 2, a vertical section through the same, at the line $b, b$, of Fig. 1; Fig. 3, a view, half in plan, with the caps of the casing and piston chamber removed, and half in horizontal section at the line $c, c$, of Fig. 4, of a water meter embodying our invention, illustrating a modification in the form of the abutments; Fig. 4, a vertical section through the same, at the line $d, d$, of Fig. 3; Fig. 5, a view, half in plan, with the caps of the casing and piston chamber removed, and half in horizontal section at the line $e, e$, of Fig. 6, of a water meter embodying our invention, illustrating a modification in the form of the abutments and in the means for maintaining their contact with the wall of the piston chamber; Fig. 6, a vertical section through the same, at the line $f, f$, of Fig. 5; Fig. 7, a horizontal section, at the line $g, g$, of Fig. 8, through a water meter embodying our invention, illustrating a further modification in the means for maintaining the contact of the abutments with the wall of the piston chamber; Fig. 8, a vertical section through the same, at the line $h, h$, of Fig. 7; Fig. 9, a view, half in plan, with the caps of the casing and piston chamber removed, and half in horizontal section at the line $i, i$, of Fig. 10, of a water meter embodying our invention, illustrating a further modification in the form of the abutments and in the means for maintaining their contact with the wall of the piston chamber, and; Fig. 10, a vertical section through the same at the line $k, k$, of Fig. 9.

In the practice of our invention, referring more particularly to Figs. 1 and 2, we provide a chamber or casing 1, which is preferably, as shown, of cylindrical form, and is provided, on opposite sides respectively, with an inlet passage or nozzle 2, and an outlet passage or nozzle 3, these being suitably adapted for connection to pipes for the reception and delivery of the liquid to be measured. The casing 1 is closed at top by a dished or outwardly projecting cap or cover plate 4, which is secured to the casing by bolts 5 and nuts 6, and is provided, on one side, with an inlet port 7, communicating with the inlet passage 2 of the casing. A piston chamber 8, finished truly on its inner surface, and closed at its ends by a cap or cover plate 9, and by a bottom plate, in this instance integral with it, is secured within the casing 1, being, in this instance, clamped, with its cap, between a shoulder on the inside of the casing and the cap 4 thereof. The space within the casing, below the piston chamber, communicates with the outlet passage 3, and the space within the cap 4 of the casing, above the piston chamber, communicates with the inlet passage 2, through the port 7. The piston chamber and its cap being interposed between the inlet and outlet passages 2 and 3, the traverse of liquid from the former to the latter can be effected only through the piston chamber. An inlet port 10 is formed centrally in the cap 9 of the piston chamber and a corresponding port or passage 11, is formed in the bottom of the piston chamber, the ports 10 and 11 being continuously in communication, one with the other, through a central port in a piston presently to be described. Annular outlet ports 12 and 13, are formed in the cap and in the base, respectively, of the piston chamber 8, the port 12 communicating with the outlet passage 3, through a channel or passage 14, formed in the cap 9, and the port 13 communicating with the passage 3, through the space within the casing 1, below and at one side of the piston chamber. A piston 15, which is preferably of cylindrical form, and is of a diameter less than, and a depth equal to, that of the piston chamber 8, is fitted freely in said chamber, that is to say, is located therein wholly independent of any axial bearing thereon or therein, the piston thus having the capacity of rotation about its own axis in the piston chamber, as well as of diametrical traverse therein, and therefore, being adapted to be eccentric to the piston chamber and to bear, peripherally, on the inner surface thereof, and, in its rotation about its own axis, to roll on the trued inner surface of the piston chamber, its bearing point thereon being, in its rotation, progressively advanced entirely around the same. A channel or passage 16 extends centrally through the piston, and is continuously in communication, at its upper and lower ends, with the upper and lower inlet ports 10 and 11 of the piston chamber, and a series of segmental ports 17, concentric with the passage 16, also extends through the piston. A series of vertical passages or guideways 18, is formed in the piston, extending inwardly from its periphery, said passages being fitted with abutments or gates 19, each of which traverses, with the piston around the inner surface of the wall of the piston chamber, and, in such traverse, bears continuously on such said surface, as hereinafter more fully described. Ports 21 lead from the ports 17 of the piston, to the inner ends of the several guide ways 18, and lateral ports 22, formed in said guide ways, establish communication, between the ports 17 and 21 and the spaces in the piston chamber exterior to the piston, between adjacent abutments.

As shown in Figs. 1 and 2, the several abutments 19, which are of cylindrical form, are maintained at such distance apart diametrically that each shall be continuously in contact with the inner surface of the wall of the piston chamber, by a distance regulating device, which, in this case, consists of distance rods 23, each passing freely and diametrically through the piston 15, and having heads 24 on its ends which bear against the abutments located in the two opposite guide ways 18 which are in line with the rod. The distance between the outer faces of the two heads of each distance rod 23, plus the diameters of the two abutments 19 against which it bears, is slightly less than the inside diameter of the piston chamber 8, the difference being imperceptible in practice and being made to compensate for the eccentricity of the piston, and it will therefore be seen that, throughout the movement of the piston about its own axis in the chamber, the several abutments are held to a bearing against the inner surface of the wall thereof, the piston traversing in a radial direction on the distance rods and abutments, alternately to and from each abutment, and having a movement of rotation about its own axis on the inner surface of the wall of the chamber, in which movement the several abutments traverse around and remain continuously in contact with said surface.

The specific form of the abutments, and the means whereby they are held uniformly to their bearing on the piston chamber, are not, however, essentials of our invention, as the same may be varied materially without departure from the spirit and operative principle thereof.

We have herein shown, and will describe, modifications of structure in the particulars above referred to, and it will be obvious that other and further modifications may be made by a skilled mechanic familiar with our invention.

A pin or stem 25 secured centrally in the top of the piston 15, bears against one side of an arm 26, fixed upon a vertical shaft 27, which is journaled in a bearing above and concentric with the piston chamber 8. Each revolution of the piston about its own axis will therefore effect a coincident revolution of the shaft 27 less the ratio of difference of the circumferences of the piston and piston chamber, that is to say, if the circumference of the piston is, for example, one ninth less than the inner circumference of the piston chamber, each revolution of the piston will coincidently effect eight ninths of a revolution of the shaft 27. The shaft 27 through a suitable train of gearing 28, 29, 30, 31, rotates a shaft 32 passing through a stuffing box 33, in the cap 4 of the casing, and actuating an indicating or registering mechanism of any suitable and preferred construction, which is located in a register case 34 connected to the cap 4.

In lieu of the crank connection shown it will be obvious that gearing may, if preferred, be substituted. The registering mechanism does not, in and of itself, form any part of our present invention, and need not, therefore, be herein described.

In the operation of a liquid meter similar or equivalent in construction to that hereinbefore described, the liquid to be measured passes through the inlet passage 2, port 7, space within the cap 4, port 10 of the cap of the piston chamber, passage 16, and port 11, into such of the ports 17 of the piston 15 as may be uncovered and open to the inlet ports 10 and 11. From such ports 17, it passes, through the communicating lateral ports 21 and 22, into the spaces between the piston and inner wall of the piston chamber, and between the abutments 19 on each side of the ports 17 which are open to the inlet ports 10 and 11, the pressure of liquid forcing the piston against the opposite side of the piston chamber and imparting to the piston a movement of rotation about its own axis, and to the abutments 19, a common movement of rotation about the axis of the piston chamber. While the admission of liquid to the piston chamber is thus being effected at one side of the piston, liquid is being coincidently exhausted therefrom on the opposite side, through the ports 22 and 21 communicating with such of the ports 17 as are uncovered and open to the outlet ports 12 and 13 of the piston chamber, and from said outlet ports to and through the exit passage 3. It will thus be seen that the piston rolls or rotates on and entirely around the trued inner surface of the wall of the piston chamber, being subject to delivery pressure on one side, and exhausting from the other, and that there will be a continuous series of successive admissions and discharges of liquid to be measured to and from the spaces between the piston, the piston chamber, and the abutments, by the alternate opening and closure of the piston ports 17, relatively to the inlet and outlet ports of the piston chamber, the abutments being, also, caused to traverse continuously upon and around the surface of the piston chamber, in and by the movements of the piston therein.

Figs. 3 and 4 illustrate a construction differing from that first described only in the particular that, in this instance, the abutments or gates 19 are in the form of blocks of substantially rectangular cross section, instead of being cylindrical as in the former case. The end bearing faces of the abutments are curved to enable them to bear upon the piston chamber, without cramping, in all the positions relatively to the axis of the piston which they occupy during the rotation thereof.

The construction and relation of all the other parts, and the operation of the appliance, are as first described.

In the modification shown in Figs. 5 and 6, the abutments 19 are of similar form to those of Figs. 3 and 4, but a different means is adopted for holding them at the proper distance apart diametrically, to maintain their outer faces in contact with the surface of the piston chamber: To this end, in lieu of interposing distance rods 23 between diametrically opposite abutments, as in the preceding figures, each abutment is provided, on its upper and its lower side, with a curved faced trunnion or pivot 35, said trunnions fitting freely, and being guided in, annular channels or grooves 36 and 37, formed, respectively, in the cap 9 of the piston chamber, and in its bottom plate, said channels being of equal diameters and concentric with the piston chamber. It will be seen that the function of the distance rods 23, of Figs. 1 to 4 inclusive, is equivalently performed by the body of metal in the cap and base of the piston chamber between the inner faces of the trunnions of each pair of oppositely located abutments, and that the relation of the trunnions and grooves, to the guide ways 18 of the piston, is such that the bearing faces of the abutments are held continuously against the inner surface of the wall of the piston chamber, the piston being also permitted to move inwardly and outwardly relatively to each abutment as in the preceding cases.

Figs. 7 and 8 illustrate another modification of the means for holding the abutments to their continuous normal bearing on the piston chamber. In this instance, the abutments 19 are, similarly to those of Figs. 1 and 2, of cylindrical form, and are held up to the inner surface of the piston chamber by a distance ring 38, inserted and fitting freely in a horizontal recess 39, formed in the lower section of the piston 15, which, to admit of the insertion of the ring 38, is made in two superposed sections. The ring 38, which is concentric with the piston chamber, bears, by its outer surface, upon the several abutments 19, the width of the annular space between its outer surface and the inner surface of the piston chamber being such as to admit of the neat fit of the abutments 19 between said surfaces. The abutments are thus maintained, as before, in contact with the piston chamber, while radial movement of the piston toward and from the several abutments, in the rotation of the piston, takes place without restriction. In order to prevent the passage of liquid from one of the spaces exterior to the piston to another, through the recess 39, gates or partitions 40, recessed to fit under and on each side of the distance ring 38, are interposed between the several abutments 19, said gates sliding radially in vertical channels or grooves 41, in the lower piston section.

The modification illustrated in Figs. 9 and 10 is analogous to that of Figs. 5 and 6, in the particular that the outer ends of the abutments 19 are held up to the surface of the piston chamber by trunnions or pivots 35, fitting in upper and lower guide channels or grooves 36 and 37, concentric with the piston chamber. This instance, however, differs from the preceding ones, in the form of the abutments 19, and the articulated connection of the inner ends thereof to the piston 15, so that the movements of the piston toward and from the surface of the piston chamber in its rotation thereon, impart vibratory movements to the abutments. The abutments 19 have the form of swinging or vibratory flaps or gates, the outer ends of which are caused to traverse on and around the inner wall of the piston chamber by trunnions 35, fitting in upper and lower guide channels 36 and 37 as before described, while their inner ends are formed as cylindrical pivots 42, fitting corresponding recesses at the inner ends of the guide ways 18 of the piston. The construction and relation of ports and passages, and the operation of the appliance are, in all respects, as before described.

It will be seen that the working members of the meter are few, simple, and so operative as to be free from liability to derangement, breakage, or undue wear. The inner surface of the piston chamber can be smoothly and truly finished at very slight cost, and, by reason of the rolling movement of the piston on and entirely around the inner surface of the chamber, uniform wear of these parts is insured. The movement of the series of abutments around the piston chamber acts to keep in agitation any sediment or other foreign matter contained in the liquid which is passed through the meter and thereby tends to prevent the clogging of the meter by the deposition of such foreign matter.

The device may be employed as a fluid pressure motor without variation of structure or operative principle.

We claim as our invention and desire to secure by Letters Patent—

1. The combination, in a liquid meter, of a piston chamber provided with inlet and discharge ports, a piston located eccentrically in said chamber and free from axial bearing thereon or therein, said piston rotating about its own axis in, and rolling peripherally on the inner surface of said chamber, and being provided with ports registering alternately with the inlet and the discharge ports of said chamber, and a series of abutments fitting in said piston and fitting against the piston chamber, substantially as set forth.

2. The combination, in a liquid meter, of a piston chamber provided with inlet and discharge ports, a piston located eccentrically in said chamber and free from axial bearing thereon or therein, said piston rotating about its own axis in, and rolling peripherally on and around the inner surface of said chamber, and being provided with ports registering alternately with the inlet and the discharge ports of the piston chamber, a series of abutments fitting in said piston and fitting against the piston chamber, and a casing inclosing the piston chamber and provided with inlet and outlet passages communicating, respectively, with the inlet and discharge ports of the piston chamber, substantially as set forth.

3. The combination, in a liquid meter, of a piston chamber provided with inlet and discharge ports, a piston located eccentrically in said chamber and free from axial bearing thereon or therein, said piston rotating about its own axis in, and rolling peripherally on and around the inner surface of said chamber, and being provided with ports registering alternately with the inlet and the discharge ports of the piston chamber, a series of abutments fitting in said piston and fitting against the piston chamber, a shaft journaled concentrically with the piston chamber and coupled to a central pin on the piston, and a registering mechanism actuated by said shaft, substantially as set forth.

4. The combination, in a liquid meter, of a piston chamber provided with inlet and discharge ports, a piston located eccentrically in said chamber and free from axial bearing thereon or therein, said piston rotating about its own axis in, and rolling peripherally on and around the inner surface of said chamber, and being provided with ports registering alternately with the inlet and the discharge ports of the piston chamber, a series of abutments fitting in said piston, and a distance regulating device bearing on the abutments and maintaining their outer faces continuously in contact with the inner surface of the piston chamber, substantially as set forth.

5. The combination, in a liquid meter, of a piston chamber provided with inlet and discharge ports, a piston adapted to rotate about its own axis on the inner surface of said chamber and provided with ports registering alternately with the inlet and discharge ports of the piston chamber, a series of abutments fitting in guide ways in said piston, and a series of transverse distance rods, each fitting freely in the piston and bearing at its ends on two diametrically opposite abutments, substantially as set forth.

6. The combination, in a liquid meter, of a piston chamber provided with central inlet ports, and discharge ports surrounding the inlet ports, a piston of less diameter than said chamber but fitting closely therein in a plane parallel with its axis, a series of abutments fitting lateral guide ways in the piston, a series of through ports formed in the piston and adapted to register alternately with the inlet and outlet ports of the chamber, lateral ports leading from said through ports to the periphery of the piston, and a distance regulating device bearing on the abutments and maintaining their outer faces continuously in contact with the inner surface of the piston chamber, substantially as set forth.

In testimony whereof we have hereunto set our hands.

GEO. WESTINGHOUSE, JR.
EDWIN RUUD.

Witnesses to signature of Geo. Westinghouse, Jr.:
L. C. CARUANA,
F. E. GAITHER.

Witnesses to signature of Edwin Ruud:
J. SNOWDEN BELL,
R. H. WHITTLESEY.